(12) United States Patent
Tan et al.

(10) Patent No.: US 11,330,338 B2
(45) Date of Patent: May 10, 2022

(54) METHOD AND SYSTEM OF DISPLAYING VIDEO COMMENTS, COMPUTING DEVICE, AND READABLE STORAGE MEDIUM

(71) Applicant: Shanghai Bilibili Technology Co., LTD., Shanghai (CN)

(72) Inventors: Zhaoxin Tan, Shanghai (CN); Jianqiang Ding, Shanghai (CN); Fan Lan, Shanghai (CN); Jianqiang Zhang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/904,992

(22) Filed: Jun. 18, 2020

(65) Prior Publication Data
US 2020/0404380 A1 Dec. 24, 2020

(30) Foreign Application Priority Data
Jun. 19, 2019 (CN) .......................... 201910533232.6

(51) Int. Cl.
*H04N 21/4788* (2011.01)
*H04N 21/462* (2011.01)
*H04L 12/58* (2006.01)
*H04N 7/173* (2011.01)
*H04N 21/81* (2011.01)
*H04L 51/04* (2022.01)
*H04L 51/48* (2022.01)

(52) U.S. Cl.
CPC ......... *H04N 21/4788* (2013.01); *H04L 51/04* (2013.01); *H04L 51/28* (2013.01); *H04N 7/17318* (2013.01); *H04N 21/4622* (2013.01); *H04N 21/812* (2013.01)

(58) Field of Classification Search
CPC ..... H04L 51/04; H04L 51/28; H04N 21/4312; H04N 21/4622; H04N 21/4788; H04N 21/812; H04N 7/17318
See application file for complete search history.

(56) References Cited

U.S. PATENT DOCUMENTS

| 2013/0145248 A1* | 6/2013 | Friedlander | G06Q 10/107 |
| | | | 715/230 |
| 2014/0099070 A1* | 4/2014 | Makino | G11B 27/322 |
| | | | 386/240 |
| 2020/0252692 A1* | 8/2020 | Kawakami | H04N 21/4781 |

\* cited by examiner

*Primary Examiner* — Farzana Hossain
(74) *Attorney, Agent, or Firm* — BakerHostetler

(57) ABSTRACT

The present disclosure describes techniques for displaying comments on videos. The disclosed techniques include obtaining a first list comprising a plurality of comment messages and a second list configured to store address information corresponding to at least one reusable comment style; determining whether the second list comprises the address information in response to a determination that a target comment message among the plurality of comment messages is initialized; selecting a piece of address information corresponding to a target comment style among the at least one reusable comment style in response to a determination that the second list comprises the address information; and generating a target comment object based on the target comment message and the target comment style corresponding to the selected piece of address information, wherein the target comment style comprises data indicative of effects of presenting the target comment message on a display device.

18 Claims, 8 Drawing Sheets

METHOD AND SYSTEM OF DISPLAYING VIDEO COMMENTS, COMPUTING DEVICE, AND READABLE STORAGE MEDIUM

CROSS-REFERENCE TO RELATED APPLICATION

The present application claims priority of Chinese patent application No. 201910533232.6, filed on Jun. 19, 2019. The entire disclosure of the above-identified application is hereby incorporated by reference and made a part of this specification.

BACKGROUND

Users may attempt to access conventional social media on their devices to communicate about interesting content. Using conventional social media may be cumbersome as users may have to switch back and forth between different applications to access the content of interest and social media related to the content. As communication devices, such as mobile phones, become more sophisticated, people continue to discover new ways to communicate.

BRIEF DESCRIPTION OF THE DRAWINGS

By reading the detailed description of the preferred embodiments below, various other advantages and benefits become clear to an ordinary technical person in the field. The drawings are only for a purpose of illustrating preferred embodiments and are not to be considered as a limitation of the present invention. And in the whole drawings, the same reference numerals are used throughout the drawings to refer to the same parts. In the drawings.

DETAILED DESCRIPTION OF ILLUSTRATIVE EMBODIMENTS

Figure 1:
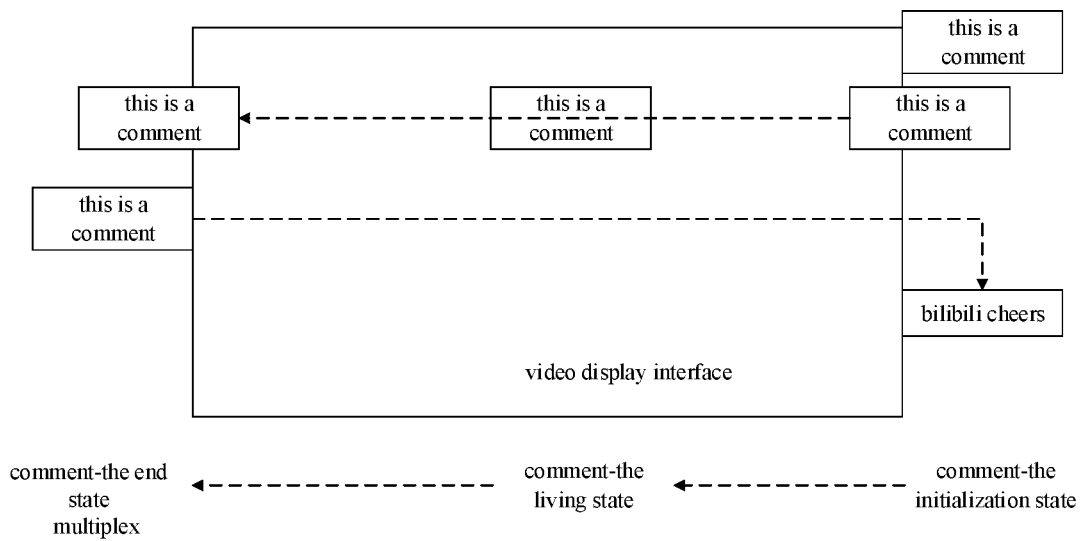
FIG. 1 illustrates an optional application environment diagram of a method of displaying video comments provided by embodiments of the present invention.

With the rapid development of network communication technology, comments have gradually become a major feature of Internet video. Comments refer to the comments that appear directly on a video, which can appear on the Internet video in a variety of ways, such as scrolling, static and so on. When a comment ends, a DOM node of the comment is usually deleted. When a new comment needs to be rebuilt, a new DOM node is created for the new comment. The present disclosure describes techniques that can greatly increases DOM creation time, increases the number of times of a browser redrawing the comment, reduces drawing efficiency of the browser, and affects performance of the browser.

To make the purpose, technical solutions and advantages of the present invention more comprehensible, the present invention is described in further detail below with reference to embodiments and the accompanying drawings. It should be understood that the specific embodiments described herein are merely used for explaining the present invention, and are not intended to limit the present invention. All other embodiments obtained by those skilled in the field based on the embodiments of the present invention without creative efforts shall fall within the protection scope of the present invention.

The object of the present invention is to provide a method and a system of displaying video comments, a computing device, and a readable storage medium, which can greatly reduce creation time of a comment style, reduce the number of times of a browser redrawing a comment, then improve drawing efficiency and performance of the browser.

One aspect of the present invention provides a method of displaying video comments, the method comprising:

obtaining a comment message list and a multiplex comment list, wherein the comment message list comprises a plurality of comment messages, and one of the plurality of the comment messages is a target comment message;

searching whether addressing information of a reusable comment style is existed in the multiplexed comment list, when the target comment message is initialized;

selecting a piece of the addressing information of the reusable comment style from the multiplex comment list as target addressing information, when the addressing information of the reusable comment style is existed in the multiplex comment list;

multiplexing a target comment style corresponding to the target addressing information to generate a target comment object, according to the target comment message and the target comment style, and displaying the target comment object.

Preferably, the step of searching whether addressing information of a reusable comment style is existed in the multiplexed comment list, when the target comment message is initialized, further comprises:

obtaining start time of the plurality of the comment messages respectively;

determining whether the target comment message is initialized according to the start time.

Preferably, the method further comprising:

obtaining motion attributes of a plurality of comment objects, and obtaining a first comment object and a first comment style of the first comment object from the plurality of the comment objects according to the motion attributes of the plurality of the comment objects, wherein the plurality of the comment objects comprise the first comment object, each comment object comprises a comment message and a comment style, and the motion attributes at least comprise: scrolling, reverse and static;

detecting a survival state of the first comment object, and the survival state comprises at least: an initialization state, a living state and an end state;

obtaining a first piece of addressing information of the first comment style, and storing the first addressing information at a beginning node position of the multiplex comment list when the first comment object is in the end state.

Preferably, the step of obtaining motion attribute of a plurality of comment objects, and obtaining a first comment object and a first comment style of the first comment object from the plurality of the comment objects according to the motion attribute of the plurality of the comment objects, further comprises:

obtaining the motion attributes of the plurality of the comment objects from plurality of the comment styles of the plurality of the comment objects respectively, and identifying motion states of the plurality of the comment objects according to the motion attributes of the plurality of the comment objects separately;

selecting a comment object as the first comment object, when one or more of the plurality of the comment objects is in the motion state, from the one or more of the plurality of the comment objects.

Preferably, the step of detecting a survival state of the first comment object, further comprises:

detecting comment data of each frame of the first comment object, wherein the comment data of each frame comprises a survival state attribute of the first comment object of each frame, and the survival state attribute comprises at least initialization, living, end;

identifying the survival state of the first comment object according to the survival state attribute;

identifying the first comment object being in the initialization state when the survival state attribute is the initialization;

identifying the first comment object being in the living state when the survival state attribute is the living;

identifying the first comment object being in the end state when the survival state attribute is the end.

Preferably, the first comment style comprises comment data, the comment data comprises at least start time and duration, and the step of detecting a survival state of the first comment object, further comprises:

determining a time interval of the first comment object being in the survival state according to the start time and the duration, wherein the start time is a left endpoint of the time interval, and a sum of the start time and the duration is a right endpoint of the time interval;

obtaining current time, and determining whether the current time is within the time interval of the first comment object;

determining the first comment object being in the initialization state when the current time is less than or equal to the start time;

determining the first comment object being in the living state when the current time is within the time interval;

determining the first comment object being in the end state when the current time is greater than or equal to the right endpoint of the time interval.

Preferably, the step of selecting a piece of the addressing information of the reusable comment style from the multiplex comment list as target addressing information, when the addressing information of the reusable comment style is existed in the multiplex comment list, further comprises:

selecting the addressing information of the comment style as the target addressing information, and taking the comment style as the target comment style when a piece of the addressing information of the reusable comment style is existed;

searching the multiplex comment list to select addressing information of the comment style located at a beginning node of the multiplex comment list, taking the addressing information as the target addressing information, and taking the comment style as the target comment style when multiple pieces of the addressing information of the reusable comment style are existed.

Preferably, the method further comprising:

creating a second comment style to generate a second comment object according to the first comment message and the second comment style, and displaying the second comment object, when no target addressing information of reusable target comment styles is existed.

Preferably, the step of multiplexing a target comment style corresponding to the target addressing information to generate a target comment object, according to the target comment message and the target comment style, and displaying the target comment object, further comprises:

updating the target comment object, wherein the target comment object further comprises coordinates of the target comment object on a video display interface;

generating the target comment object according to a update result and the target comment message, and displaying the target comment object.

In order to achieve the above purpose, the present invention is also to provide a system of displaying video comments, the system specifically comprising the following components:

an obtaining module, obtaining a comment message list and a multiplex comment list, wherein the comment message list comprises a plurality of comment messages, and one of the plurality of the comment messages is a target comment message;

a searching module, searching whether addressing information of a reusable comment style is existed in the multiplexed comment list, when the target comment message is initialized;

a selecting module, selecting a piece of the addressing information of the reusable comment style from the multiplex comment list as target addressing information, when the addressing information of the reusable comment style is existed in the multiplex comment list;

a processing module, multiplexing a target comment style corresponding to the target addressing information to generate a target comment object, according to the target comment message and the target comment style, and displaying the target comment object.

In order to achieve the above purpose, the present invention is also to provide a computing device, which comprises a memory, a processor, and computer programs that stored in the memory and operable on the processor, wherein the processor executes the computer programs for implementing steps of the method of displaying video comments described above.

In order to achieve the above purpose, the present invention is also to provide a computer-readable storage medium, which stores computer programs, the computer programs can be executed by a processor to implement steps of the method of displaying video comments described above.

The method and system of displaying video comments, computing device, and readable storage medium provided by the present invention, the comment message list is obtained, and when the target comment message in the comment message list is initialized, the multiplex comment list is searched for whether addressing information of a reusable comment style is existed. When the addressing information of the reusable comment style is existed, a piece of target addressing information of a target comment style is selected, and the target comment style corresponding to the target addressing information is multiplexed to generate a target comment object according to the target comment message and the target comment style, and the target comment object is displayed on a display interface. The embodiment of the present invention can greatly reduce creation time of the comment style, reduce the number of times of a browser redrawing the comment, so as to improve drawing efficiency and performance of the browser. FIG. 1 illustrates an optional application environment diagram of a method of displaying video comments provided by embodiments of the present disclosure. In FIG. 1, a comment object of "this is a comment" scrolls and is displayed on a video display interface, and the comment object of "this is a comment" scrolls from a right end to a left end on the video display interface. In FIG. 1, an upper right corner of the video display interface is an initialization state of the comment object of "this is a comment", and a lower left corner is an end state of the comment object of "this is a comment". When the comment object of "this is a comment " ends and a new comment message of "bilibili cheers" enters from the right end of the video display interface, a comment style of the comment message of "this is a comment" is multiplexed to generate the comment object of "bilibili cheers", and is displayed from the right end to the left end of the video display interface.

It should be noted that the comment style in the embodiment of the present invention is rendered by CSS rendering, and the comment style can be a DIV element, of course, it can also be a DOM node including the DIV element.

Embodiment 1

The method of displaying video comments provided by the present invention will be described below with reference to drawings.

Figure 2:
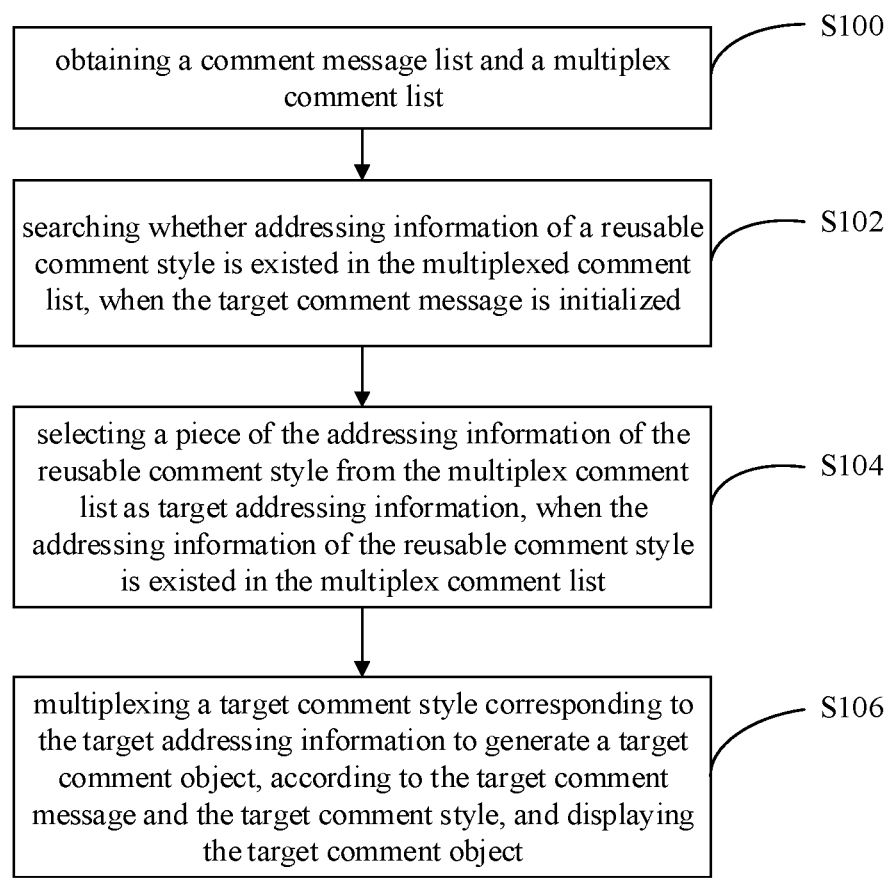
FIG. 2 illustrates an optional flowchart of the method of displaying video comments provided by the embodiments of the present invention.

FIG. 2 illustrates an optional flowchart of the method of displaying video comments of the present invention, and the method is applied to a system of displaying video comments. As shown in FIG. 2, the method specifically includes the following steps:

Step S100: obtaining a comment message list and a multiplex comment list, wherein the comment message list comprises a plurality of comment messages, and one of the plurality of the comment messages is a target comment message. The multiplex comment list is configured to store addressing information of a reusable comment style.

Step S102: searching whether addressing information of a reusable comment style is existed in the multiplexed comment list, when the target comment message is initialized.

Specifically, when the comment message list is obtained, start time of the plurality of the comment messages is obtained from the comment message list. Then, the plurality of the comment messages are determined to whether to initialize according to the start time. When the plurality of the comment messages are initialized, the multiplex comment list is searched for whether there is addressing information of reusable comment style. Please refer to the FIG. 1, for example, current time is obtained as 16:00, the start time of the comment message of "bilibili cheers" in the comment message list is 16:00, then the comment message of "bilibili cheers" is initialized, and the comment message of "bilibili cheers" is also the target comment message.

Step S104: selecting a piece of the addressing information of the reusable comment style from the multiplex comment list as target addressing information, when the addressing information of the reusable comment style is existed in the multiplex comment list.

Specifically, when addressing information of comment style is stored in the multiplexed comment list, it indicates that the addressing information of the reusable comment style is existed. When addressing information of a plurality of comment styles is stored in the plurality of the comment list, a piece of addressing information of comment style can be selected from the addressing information of the plurality of the comment styles as the target addressing information, and the comment style is the target comment style.

Step S106: multiplexing a target comment style corresponding to the target addressing information to generate a target comment object, according to the target comment message and the target comment style, and displaying the target comment object.

Exemplarily, referring to FIG. 1, if the target addressing information is address 1, and the address 1 corresponds to the comment style of the comment object of "this is a comment", then the comment style of the comment object of "this is a comment" is multiplexed according to the address 1. Then, a comment object of "bilibili Cheers" is generated according the comment message of "bilibili cheers" and the comment style of the comment object of "this is a comment", and the comment object of "bilibili cheers" is displayed on the video display interface.

It needs to be noted that since the comment style of the comment object of "this is a comment" is multiplexed into the comment object of "bilibili cheers", the comment object of "bilibili cheers" and the comment object of "this is a comment" have the same display effect on the video display interface. However, due to a motion attribute of the comment object displaying on the video display interface, the coordinates of the comment object of "bilibili cheers" generated and the comment object of "this is a comment" in the end state are different.

Figure 3:
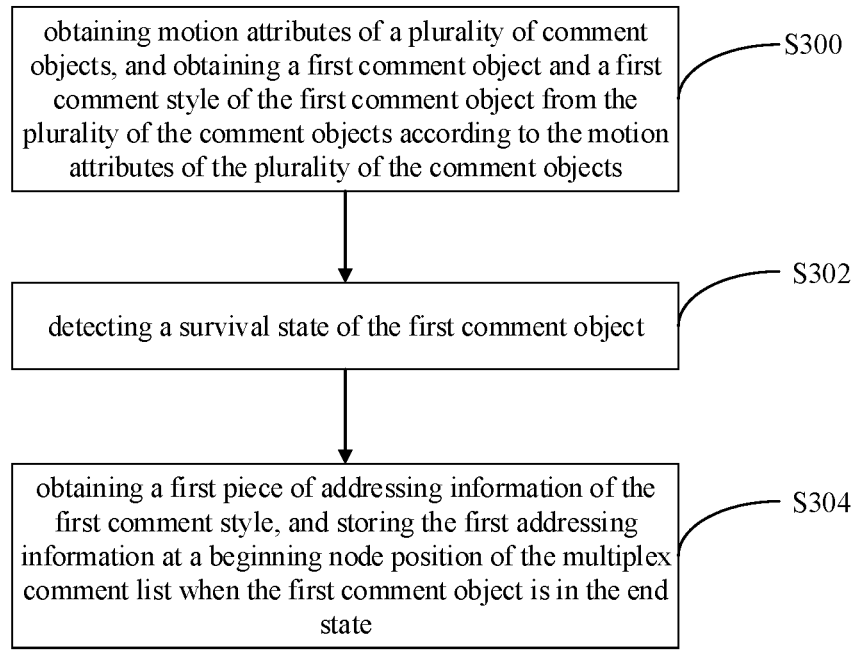
FIG. 3 illustrates another optional flowchart of the method of displaying video comments provided by the embodiments of the present invention.

In an exemplary embodiment, as shown in FIG. 3, it is another optional flow diagram of the method of displaying video comments of the present invention, including steps S300-S304.

Step S300: obtaining motion attributes of a plurality of comment objects, and obtaining a first comment object and a first comment style of the first comment object from the plurality of the comment objects according to the motion attributes of the plurality of the comment objects, wherein the plurality of the comment objects comprise the first comment object, each comment object comprises a comment message and a comment style, and the motion attributes at least comprise: scrolling, reverse and static.

Exemplarily, if a plurality of comment objects are displayed on the video display interface displays, including a plurality of static comment objects, the comment object of "this is a comment" in a scrolling state and other comment objects in the scrolling state, then the comment object of "this is a comment" and the comment style of the comment object of "this is a comment", and/or the other comment objects in the scrolling state and comment styles of the other comment objects in the scrolling state are obtained.

Step S302: detecting a survival state of the first comment object, wherein the survival state comprises at least: an initialization state, a living state and an end state.

Exemplarily, the survival state of the first comment object is detected according to state of entering, displaying or disappearing of the first comment object on the video display interface. When the first comment object enters the video display interface, the first comment object is in the initialization state. When the first comment object is displayed on the video display interface, the first comment object is in the living state. When the first comment object disappears from the video display interface, the first comment object is in the end state.

Step S304: obtaining a first piece of addressing information of the first comment style, and storing the first addressing information at a beginning node position of the multiplex comment list when the first comment object is in the end state.

Exemplarily, please continue to refer to FIG. 1. If the comment object of "this is a comment" is in the end state and addressing information of the comment style of the comment object of "this is a comment" is address 2, the address 2 is obtained, and the address 2 is stored at the beginning node position of the multiplex comment list. For example, address a, address b and address c are stored in the multiplex comment list in order, then the address 2 is stored in front of the address a, and then the address 2, address a, address b and address c are stored in the multiplex comment list in order after the address 2 is stored.

Figure 4:
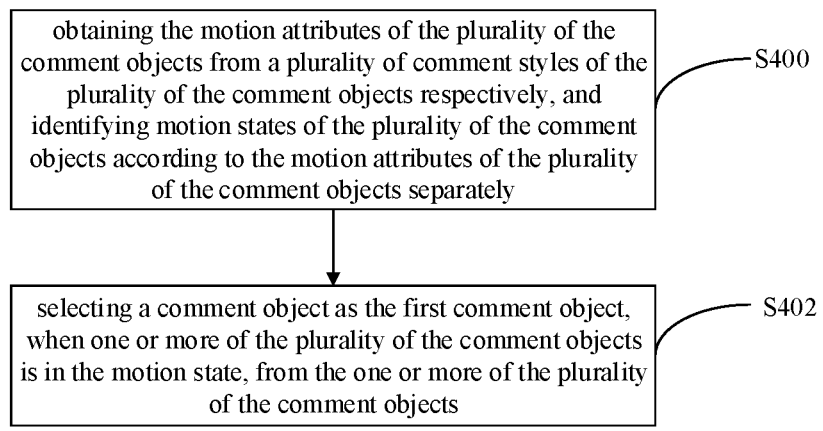
FIG. 4 illustrates a schematic diagram of an optional specific process of step S300 in the FIG. 3.

In an exemplary embodiment, as shown in FIG. 4, the step S300 may include steps S400-S402.

Step S400: obtaining the motion attributes of the plurality of the comment objects from a plurality of comment styles of the plurality of the comment objects respectively, and identifying motion states of the plurality of the comment objects according to the motion attributes of the plurality of the comment objects separately. When the motion attribute is scrolling or reverse, the motion state is identified as a motion state. When the motion attribute is static, the motion state is identified as a static state.

Step S402: selecting a comment object as the first comment object, when one or more of the plurality of the comment objects is in the motion state, from the one or more of the plurality of the comment objects.

It should be noted that in actual operations, if there are a plurality of comment objects in the motion state, and when the plurality of the comment objects are in the end state, the plurality of the comment objects and comment style of the plurality of the comment objects are obtained respectively, and comment styles of the plurality of the comment objects are stored in the multiplex comment list in order according to end time. In the embodiment of the present invention, only one comment object in the motion state is taken as an example for description.

Figure 5:
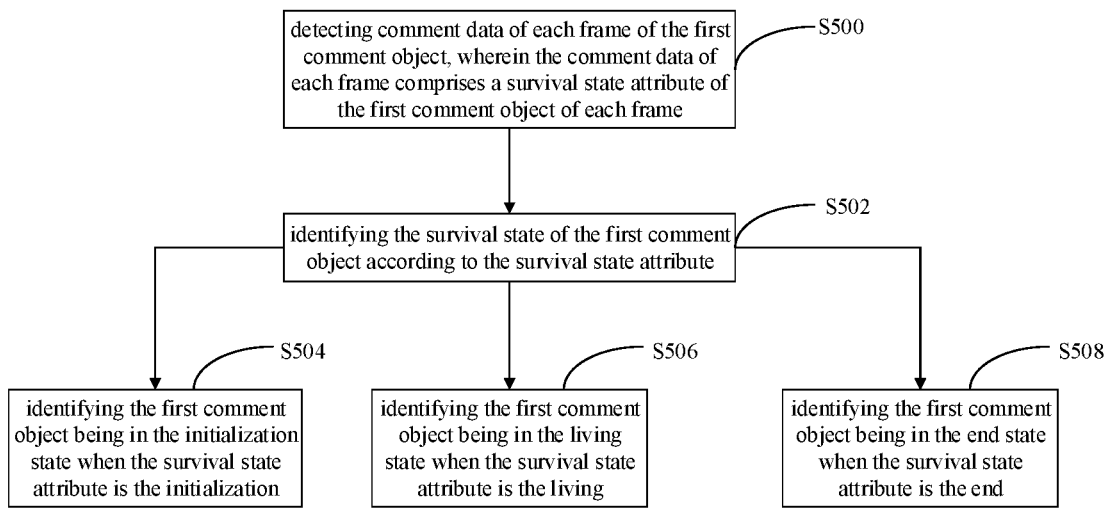
FIG. 5 illustrates a schematic diagram of an optional specific process of step S302 in the FIG. 3.

In an exemplary embodiment, as shown in FIG. 5, the step S302 may include steps S500-S508.

Step S500: detecting comment data of each frame of the first comment object, wherein the comment data of each frame comprises a survival state attribute of the first comment object of each frame, and the survival state attribute comprises at least initialization, living, end.

Step S502: identifying the survival state of the first comment object according to the survival state attribute.

Step S504: identifying the first comment object being in the initialization state when the survival state attribute is the initialization.

Step S506: identifying the first comment object being in the living state when the survival state attribute is the living.

Step S508: identifying the first comment object being in the end state when the survival state attribute is the end.

Specifically, since comment data of each frame on the video display interface contains the survival state attribute of each comment object, the survival state of each comment object can be identified by detecting the comment data of each frame.

Figure 6:
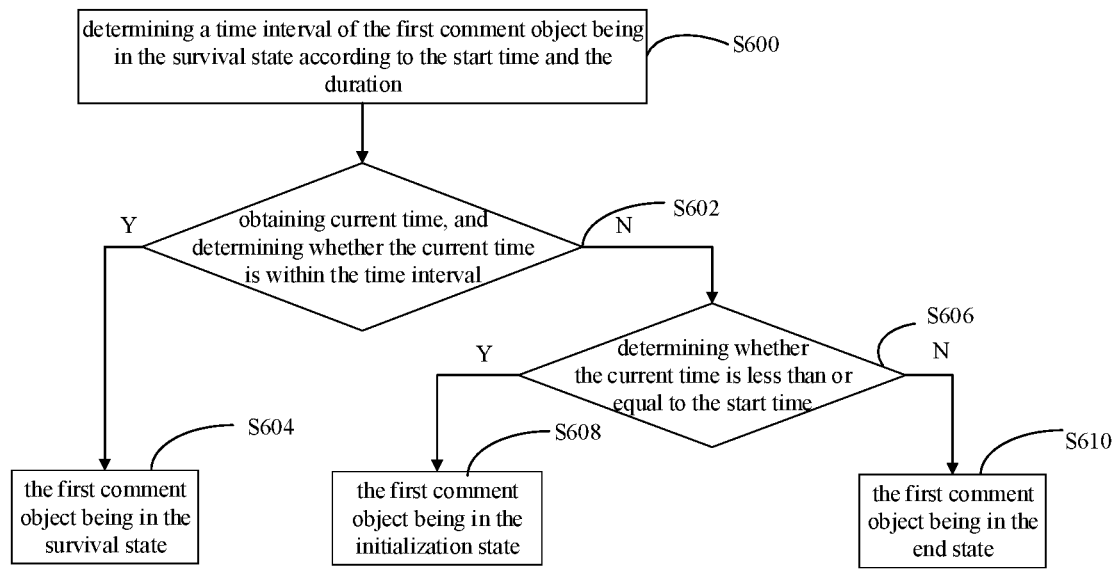
FIG. 6 illustrates a schematic diagram of another optional specific process of step S302 in the FIG. 3.

In another exemplary embodiment, as shown in FIG. 6, the step S302 may also include steps S600-S610.

Step S600: determining a time interval of the first comment object being in the survival state according to the start time and the duration, wherein the start time is a left endpoint of the time interval, and a sum of the start time and the duration is a right endpoint of the time interval.

Step S602: obtaining current time, and determining whether the current time is within the time interval. When the current time is within the time interval, step S604 is executed; otherwise, step S606 is executed.

Step S604: the first comment object being in the survival state.

Step S606: determining whether the current time is less than or equal to the start time. When the current time is less than or equal to the start time, step S608 is executed; otherwise, step S610 is executed.

Step S608: the first comment object being in the initialization state.

Step S610: the first comment object being in the end state.

Exemplarily, if the start time of the first comment object on the video display interface is 16:00 and the duration is 6 seconds, time interval of the first comment object in the survival state is (16:00-16:00:06). If the current time is 15:59:55, the first comment object is in the initialization state. If the current time is 16:0:3, the first comment object is in the survival state. If the current time is 16:0:6, the first comment object is in the end state.

Figure 7:
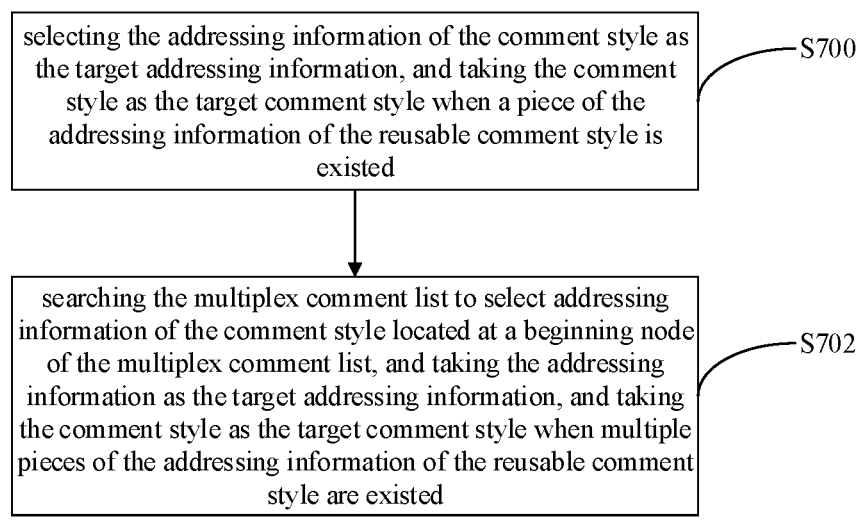
FIG. 7 illustrates a schematic diagram of an optional specific process of step S104 in the FIG. 2.

In an exemplary embodiment, as shown in FIG. 7, the step S104 may include steps S700-S702.

Step S700: selecting the addressing information of the comment style as the target addressing information, and taking the comment style as the target comment style when a piece of the addressing information of the reusable comment style is existed.

Step S702: searching the multiplex comment list to select addressing information of the comment style located at a beginning node of the multiplex comment list, and taking the addressing information as the target addressing information, and taking the comment style as the target comment style when multiple pieces of the addressing information of the reusable comment style are existed.

Exemplarily, if there is only one piece of addressing information of a reusable comment style 1 in the multiplex comment list, and the addressing information is address 1, then the address 1 is selected, the comment style 1 is multiplexed, and the comment style 1 is taken as the target comment style. If there are multiple pieces of addressing information of the reusable comment styles in the multiplex comment list, for example: address a, address b and address c are arranged in order, then the address a is selected and a comment style corresponding to the address a is multiplexed. The comment style corresponding to the address a is taken as the target comment style.

Figure 8:
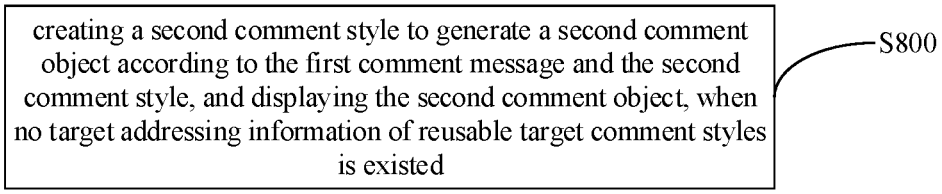
FIG. 8 illustrates another optional flowchart of the method of displaying video comments provided by the embodiments of the present invention.

In another exemplary embodiment, as shown in FIG. 8, it is another optional flow diagram of the method of displaying video comments of the present invention, and the method of displaying video comments further includes step S800.

Step S800: creating a second comment style to generate a second comment object according to the first comment message and the second comment style, and displaying the second comment object, when no target addressing information of reusable target comment styles is existed.

Exemplarily, if no addressing information is existed in the multiplex comment list, that is, there is no reusable comment style in the multiplex comment list, the second comment style is recreated, and the second comment object is generated according to the first comment message and the second comment style, and the second comment object is displayed.

Figure 9:
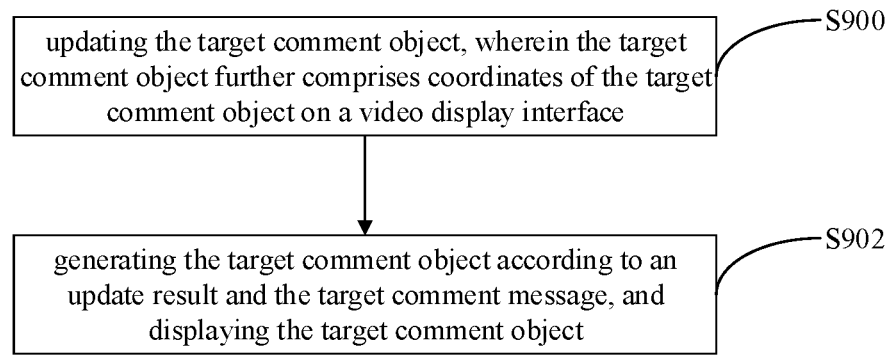
FIG. 9 illustrates a schematic diagram of an optional specific process of step S106 in the FIG. 2.

In an exemplary embodiment, as shown in FIG. 9, the step S106 may include step S900-S902.

Step S900: updating the target comment object, wherein the target comment object further comprises coordinates of the target comment object on a video display interface;

Step S902: generating the target comment object according to an update result and the target comment message, and displaying the target comment object.

Exemplarily, when the target comment style is multiplexed, the coordinates of the target comment style on the video display interface also need to be updated. For example: referring to FIG. 1, the coordinates of the comment style of the comment object of "this is a comment" in the end state are the leftmost end of the video display interface, and when the comment style is multiplexed, and the coordinates in the comment style are updated to the rightmost end of the video display interface, so that the target comment style object scrolls from the rightmost end to the leftmost end of the video display interface.

Embodiment 2

Figure 10:
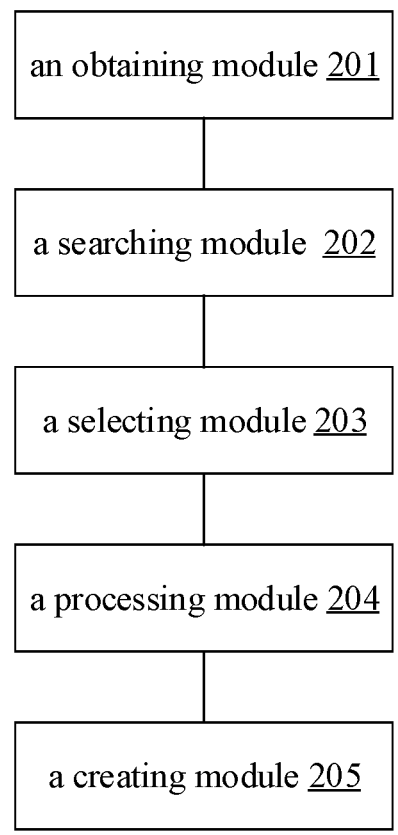
FIG. 10 illustrates a schematic diagram of an optional program module of a system of displaying video comments provided by the embodiments of the present invention.

Based on the method of displaying video comments provided in the first embodiment, a system of displaying video comments is provided in the embodiment, specifically, FIG. 10 illustrates an optional structural block diagram of the system of displaying video comments. The system of displaying video comments may be divided into one or more program modules, which are stored in a medium, and executed by one or more processors to implement the embodiment of the present invention. The program module referred to in the embodiment of the present invention refers to a series of computer program instruction segments capable of accomplishing specific functions, and is more suitable for describing execution process of the system of displaying video comments in the medium than the program itself. The following description will specifically describe the functions of the program modules of the embodiment.

As shown in FIG. 10, the system of displaying video comments specifically includes the following components:

an obtaining module 201, obtaining a comment message list and a multiplex comment list, wherein the comment message list comprises a plurality of comment messages, and one of the plurality of comment messages is a target comment message.

A searching module 202, searching whether addressing information of a reusable comment style is existed in the multiplexed comment list, when the target comment message is initialized.

Specifically, when the comment message list is obtained, start time of the plurality of the comment messages is obtained from the comment message list. Then, the plurality of the comment messages are determined to whether to initialize according to the start time. When the plurality of the comment messages are initialized, the searching module 202 searches whether there is addressing information of reusable comment style in the multiplex comment list. Please refer to the FIG. 1, for example, current time is obtained as 16:00, start time of a comment message of "bilibili cheers" in the comment message list is 16:00, then the comment message of "bilibili cheers" is initialized, and the comment message of "bilibili cheers" is also the target comment message.

A selecting module 203, selecting a piece of the addressing information of the reusable comment style from the multiplex comment list as target addressing information, when the addressing information of the reusable comment style is existed in the multiplex comment list.

Specifically, when addressing information of comment style is stored in the multiplexed comment list, it indicates that the addressing information of the reusable comment style is existed. When addressing information of a plurality of comment styles is stored in the plurality of the comment list, the selecting module 203 can select a piece of addressing information of comment style from the addressing information of the plurality of the comment styles as the target addressing information, and the comment style is the target comment style.

A processing module 204, multiplexing a target comment style corresponding to the target addressing information to generate a target comment object, according to the target comment message and the target comment style, and displaying the target comment object.

Exemplarily, referring to FIG. 1, if the target addressing information is address 1, and the address 1 corresponds to the comment style of the comment object of "this is a comment", then the processing module 204 multiplexes the comment style of the comment object of "this is a comment" according to the address 1. Then, a comment object of "bilibili cheers" is generated according the comment message of "bilibili cheers" and the comment style of the comment object of "this is a comment", and the comment object of "bilibili cheers" is displayed on the video display interface.

It needs to be noted that since the comment style of the comment object of "this is a comment" is multiplexed into the comment object of "bilibili cheers", the comment object of "bilibili cheers" and the comment object of "this is a comment" have the same display effect on the video display interface. However, due to the motion attribute of the comment object displaying on the video display interface, the coordinates of the comment object of "bilibili cheers" generated and the comment object of "this is a comment" in the end state are different.

The searching module 202 further includes an obtaining unit, a detecting unit and a storing unit, wherein:

The obtaining unit, obtaining motion attributes of a plurality of comment objects, and obtaining a first comment object and a first comment style of the first comment object from the plurality of the comment objects according to the motion attributes of the plurality of the comment objects, wherein the plurality of the comment objects comprise the first comment object, each comment object comprises a comment message and a comment style, and the motion attributes at least comprise: scrolling, reverse and static.

Exemplarily, if a plurality of comment objects are displayed on the video display interface, including a plurality of static comment objects, the comment object of "this is a comment" in a scrolling state and other comment objects in the scrolling state, then the obtaining unit obtains the comment object of "this is a comment" and the comment style of the comment object of "this is a comment", and/or the other comment objects in the scrolling state and comment styles of the other comment objects in the scrolling state.

The detecting unit, detecting a survival state of the first comment object, wherein the survival state comprises at least: an initialization state, a living state and an end state.

Exemplarily, the detecting unit detects the survival state of the first comment object according to state of entering, displaying or disappearing of the first comment object on the video display interface. When the first comment object enters the video display interface, the first comment object is in the initialization state. When the first comment object is displayed on the video display interface, the first comment object is in the living state. When the first comment object disappears from the video display interface, the first comment object is in the end state.

The obtaining unit, further obtaining a first piece of addressing information of the first comment style when the first comment object is in the end state.

The storing unit, storing the first addressing information at a beginning node position of the multiplex comment list.

Exemplarily, please continue to refer to FIG. 1. If the comment object of "this is a comment" is in the end state, and addressing information of the comment style of the comment object of "this is a comment" is address 2, the obtaining unit obtains the address 2, and the storing unit stores the address 2 at the beginning node position of the multiplex comment list. For example, address a, address b and address c are stored in the multiplex comment list, then the address 2 is stored in front of the address a, and then the address 2, address a, address b and address c are stored in the multiplex comment list in order after the address 2 is stored.

The obtaining unit, further obtaining the motion attributes of the plurality of the comment objects from a plurality of comment styles of the plurality of the comment objects respectively, and identifying motion states of the plurality of the comment objects according to the motion attributes of the plurality of the comment objects separately. When the motion attribute is scrolling or reverse, the motion state is identified as a motion state. When the motion attribute is static, the motion state is identified as a static state. When one or more of the plurality of the comment objects is in the motion state, a comment object is obtained from the one or more of the plurality of the comment objects as the first comment object.

It should be noted that in actual operations, if there are a plurality of comment objects in the motion state, and when the plurality of the comment objects are in the end state, the plurality of the comment objects and comment style of the plurality of the comment objects are obtained respectively, and comment styles of the plurality of the comment objects are stored in the multiplex comment list in order according to end time. In the embodiment of the present invention, only one comment object in the motion state is taken as an example for description.

The detecting unit, further detecting comment data of each frame of the first comment object, wherein the comment data of each frame comprises a survival state attribute of the first comment object of each frame, and the survival state attribute comprises at least initialization, living, end. The survival state of the first comment object is identified according to the survival state attribute. When the survival state attribute is the initialization, the first comment object is identified being in the initialization state. When the survival state attribute is the living, the first comment object is identified being in the living state. When the survival state attribute is the end, the first comment object is identified being in the end state.

Specifically, since the comment data of each frame on the video display interface contains the survival state attribute of each comment object, the detecting unit identifies the survival state of each comment object by detecting the comment data of each frame.

The detecting unit, further determining a time interval of the first comment object being in the survival state according to the start time and the duration, wherein the start time is a left endpoint of the time interval, and a sum of the start time and the duration is a right endpoint of the time interval. Current time is obtained, and whether the current time is within the time interval is determined. When the current time is within the time interval, the first comment object is identified being in the survival state. When the current time is less than or equal to the start time, the first comment object is identified being in the initialization state. When the current time is greater than or equal to the right endpoint of the time interval, the first comment object is identified being in the end state.

Exemplarily, if the start time of the first comment object on the video display interface is 16:00 and the duration is 6 seconds, time interval of the first comment object in the survival state is (16:00-16:00:06). If the current time is 15:59:55, the first comment object is in the initialization state. If the current time is 16:0:3, the first comment object is in the survival state. If the current time is 16:0:6, the first comment object is in the end state.

The selecting module 203, further selecting the addressing information of the comment style as the target addressing information, and taking the comment style as the target comment style when a piece of the addressing information of the reusable comment style is existed.

The selecting module 203, further searching the multiplex comment list to select addressing information of the comment style located at a beginning node of the multiplex comment list, and taking the addressing information as the target addressing information, and taking the comment style as the target comment style when multiple pieces of the addressing information of the reusable comment style are existed.

Exemplarily, if there is only one piece of addressing information of reusable comment style 1 in the multiplex comment list, and the addressing information is address 1, then the selecting module 203 selects the address 1, multiplexes the comment style 1, and takes the comment style 1 as the target comment style. If there are multiple pieces of addressing information of the reusable comment styles in the multiplex comment list, for example: address a, address b and address c arranged in order, then the address a is selected and a comment style corresponding to the address a is multiplexed. The comment style corresponding to the address a is taken as the target comment style.

In another exemplary embodiment, the system of displaying video comments further includes a creating module 205.

The creating module 205, creating a second comment style to generate a second comment object according to the first comment message and the second comment style, and displaying the second comment object, when no target addressing information of reusable target comment styles is existed.

Exemplarily, if no addressing information is existed in the multiplex comment list, that is, there is no reusable comment style in the multiplex comment list, the creating module 205 recreates the second comment style, and generates the second comment object according to the first comment message and the second comment style, and displays the second comment object.

The processing module 204, further updating the target comment object, wherein the target comment object further comprises coordinates of the target comment object on a video display interface, and generating the target comment object according to an update result and the target comment message, and displaying the target comment object.

Exemplarily, when the target comment style is multiplexed, the processing module 204 also needs to update the coordinates of the target comment style on the video display interface in the target comment style. For example: referring to FIG. 1, the coordinates of the comment style of the comment object of "this is a comment" in the end state are the leftmost end of the video display interface, and when the comment style is multiplexed, the processing module 204 updates the coordinates in the comment style to the rightmost end of the video display interface, so that the target comment style object scrolls from the rightmost end to the leftmost end of the video display interface.

Embodiment 3

Figure 11:
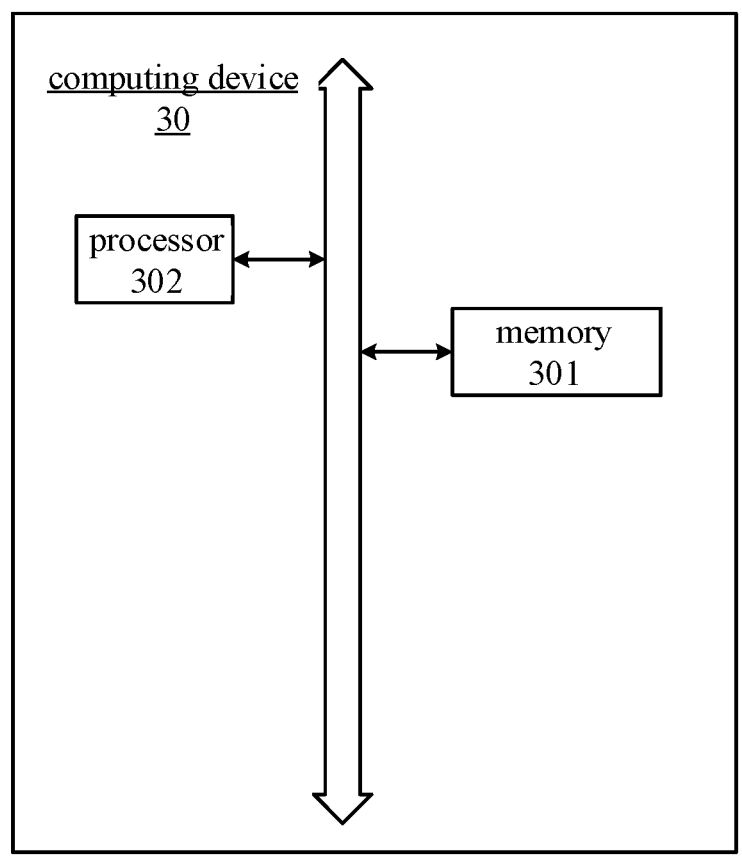
FIG. 11 illustrates an optional diagram of hardware architecture of a computing device provided by the embodiments of the present invention.

The embodiment also provides a computing device may be a smartphone, tablet, laptop, desktop computer, rack server, blade server, tower server, or cabinet server (including stand-alone servers, or a cluster of multiple servers) that can execute programs, and so on. As shown in FIG. 11, the computing device 30 in the embodiment includes, but is not limited to, a memory 301 that can communicate with each other through a system bus, a processor 302. It needs to be noted that FIG. 11 shows only a computing device 30 having components 301-302, but it is understood that it is not required to implement all of the shown components and that more or fewer parts can be implemented in lieu thereof.

In the embodiment, the memory 301(that is a readable storage medium) includes a flash memory, a hard disk, a multimedia card, a card type memory (e.g., SD or DX memory, etc.), a random access memory (RAM), a static random access memory (SRAM), a read-only memory (ROM), electrically erasable programmable read-only memory (EEPROM), programmable read-only memory (PROM), magnetic memory, magnetic disk, optical disk, etc. In some embodiments, the memory 301 may be an internal storage module of the computing device 30 such as the hard disk or memory of the computing device 30. In other embodiments, the memory 301 may also be an external storage device of the computing device 30, such as a plugged hard disk provided on the computing device 30, a smart media card (SMC), a secure digital (SD) card, a flash memory card, and the like. Of course, the memory 301 may also include both an internal storage module and an external storage device of the computing device 30. In the embodiment, the memory 301 is generally used to store an operating system and various types of application software installed in the computing device 30 such as program codes of the system of displaying video comments of the embodiment 2 and the like. In addition, the memory 301 may also be used to temporarily store various types of data that have been or will be outputted.

The processor 302, in some embodiments, may be a Central Processing Unit (CPU), a controller, a microprocessor, or other data processing chips. The processor 302 is generally used to control the overall operation of the computing device 30.

Specifically, in the embodiment, the processor 302 is used to execute the program of a method of displaying video comments stored in the processor 302, when the program of the method of displaying video comments is executed, the following steps are implemented:

obtaining a comment message list and a multiplex comment list, wherein the comment message list comprises a plurality of comment messages, and one of the plurality of the comment messages is a target comment message;

searching whether addressing information of a reusable comment style is existed in the multiplexed comment list, when the target comment message is initialized;

selecting a piece of the addressing information of the reusable comment style from the multiplex comment list as target addressing information, when the addressing information of the reusable comment style is existed in the multiplex comment list;

multiplexing a target comment style corresponding to the target addressing information to generate a target comment object, according to the target comment message and the target comment style, and displaying the target comment object.

The specific embodiment process of the above method steps can be referred to the first embodiment, which is not repeatedly described in this embodiment.

Embodiment 4

The embodiment also provides a computer-readable storage medium maybe a flash memory, a hard disk, a multimedia card, a card type memory (e.g., SD or DX memory, etc.), a random access memory (RAM), a static random access memory (SRAM), a read-only memory (ROM), electrically erasable programmable read-only memory (EEPROM), programmable read-only memory (PROM), magnetic memory, magnetic disk, optical disk, server, App store etc, which stores computer-readable instructions that upon execution by a processor cause the processor to implement the following steps:

obtaining a comment message list and a multiplex comment list, wherein the comment message list comprises a plurality of comment messages, and one of the plurality of the comment messages is a target comment message;

searching whether addressing information of a reusable comment style is existed in the multiplexed comment list, when the target comment message is initialized;

selecting a piece of the addressing information of the reusable comment style from the multiplex comment list as target addressing information, when the addressing information of the reusable comment style is existed in the multiplex comment list;

multiplexing a target comment style corresponding to the target addressing information to generate a target comment object, according to the target comment message and the target comment style, and displaying the target comment object.

The specific embodiment process of the above method steps can be referred to the first embodiment, which is not repeatedly described in this embodiment.

The method and system of displaying video comments, computing device, and readable storage medium provided by the present invention, the comment message list is obtained, and when the target comment message in the comment message list is initialized, the multiplex comment list is searched for whether addressing information of a reusable comment style is existed. When the addressing information of the reusable comment style is existed, a piece of target addressing information of a target comment style is selected, and the target comment style corresponding to the target addressing information is multiplexed to generate a target comment object according to the target comment message and the target comment style, and the target comment object is displayed on a display interface. The embodiment of the present invention can greatly reduce creation time of the comment style, reduce the number of times of a browser redrawing the comment, so as to improve drawing efficiency and performance of the browser.

It should be noted that, in this article, the terms "including", "including" or any other variants thereof are intended to cover non-exclusive inclusion, so that a process, method, article or device including a series of elements includes not only those elements, It also includes other elements not explicitly listed, or elements inherent to such a process, method, article, or device. Without more restrictions, an element limited by the sentence "including a . . . " does not exclude that there are other identical elements in the process, method, article, or device that includes the element.

The above-mentioned serial numbers of the embodiments of the present invention are merely for description, and do not represent the superiority or inferiority of the embodiments.

Through the description of the above embodiments, those skilled in the art can clearly understand that the methods in the above embodiments can be implemented by means of software plus a necessary general hardware platform, and of course, can also be implemented by hardware, but in many cases the former is better Implementation.

The embodiments described above are just preferred embodiments of the present invention and thus do not limit the patent scope of the present invention. Any equivalent structure, or equivalent process transformation made according to the contents of the description and the drawings of the present invention or any direct or indirect application to other related arts shall be also included in the patent protection scope of the present invention.

What is claimed is:

1. A method of displaying comments on videos, comprising:
    obtaining a first list and a second list, wherein the first list comprises a plurality of comment messages, and the second list is configured to store address information corresponding to at least one reusable comment style;
    determining whether the second list comprises the address information corresponding to the at least one reusable comment style in response to a determination that a target comment message among the plurality of comment messages is initialized;
    selecting a piece of address information corresponding to a target comment style among the at least one reusable comment style in response to a determination that the second list comprises the address information;
    generating a target comment object based on the target comment message and the target comment style corresponding to the selected piece of address information, wherein the target comment style comprises data indicative of effects of presenting the target comment message on a display device; and
    wherein the method further comprises:
    in response to a determination that the second list does not comprise any address information, generating a second comment style as the target comment style.

2. The method of claim 1, further comprising:
    obtaining a start time of displaying the target comment message; and
    determining whether the target comment message is initialized based at least in part on the start time.

3. The method of claim 1, further comprising:
    obtaining motion attributes associated with a plurality of comment objects, wherein the motion attributes comprise at least one of scrolling, reversing, or being static, and each of the plurality of comment objects comprises a comment message and a comment style;
    obtaining a first comment object among the plurality of comment objects and a first comment style of the first comment object based on the motion attributes associated with the plurality of the comment objects;
    determining a state of the first comment object, wherein the state comprises an initialization state, a living state, or an end state;
    obtaining a first piece of address information corresponding to the first comment style; and
    in response to a determination that the first comment object is in the end state, storing the first piece of address information at a beginning node position of the second list.

4. The method of claim 3, further comprising:
    obtaining the motion attributes from a plurality of comment styles of the plurality of comment objects;
    identifying motion states of the plurality of comment objects based on the motion attributes associated with the plurality of comment objects; and
    selecting a comment object among the plurality of comment objects as the first comment object, wherein the comment object is in a motion state.

5. The method of claim 3, further comprising:
    detecting data associated with each frame of the first comment object, wherein the data comprise a state attribute of each frame of the first comment object; and
    determining the state of the first comment object based on the state attribute.

6. The method of claim 3, wherein the first comment style comprises information indicative of a start time and a duration of displaying the first comment object, and wherein the determining a state of the first comment object further comprises:
    determining a time interval associated with the first comment object, wherein the start time is a left endpoint of the time interval, and a sum of the start time and the duration is a right endpoint of the time interval;
    obtaining a current time and determining whether the current time is within the time interval associated with the first comment object;
    determining that the first comment object is in the initialization state when the current time is less than or equal to the start time;
    determining that the first comment object is in the living state when the current time is within the time interval; and
    determining that the first comment object is in the end state when the current time is greater than or equal to the right endpoint of the time interval.

7. The method of claim 1, wherein the selecting a piece of address information corresponding to a target comment style further comprises:
    in response to a determination that the second list comprises only one piece of address information, selecting the only one piece of address information; and
    in response to a determination that the second list comprises a plurality of pieces of address information, searching the second list and selecting a piece of address information located at a beginning node of the second list.

8. The method of claim 1, further comprising:
    updating the target comment style, wherein the target comment style further comprises coordinates of presenting the target comment message on the display device; and generating the target comment object based on the updated target comment style and the target comment message.

9. A system of displaying comments on videos, comprising:
at least one processor; and
at least one memory communicatively coupled to the at least one processor and storing instructions that upon execution by the at least one processor cause the system to:
obtain a first list and a second list, wherein the first list comprises a plurality of comment messages, and the second list is configured to store address information corresponding to at least one reusable comment style;
determine whether the second list comprises the address information corresponding to the at least one reusable comment style in response to a determination that a target comment message among the plurality of comment messages is initialized;
select a piece of address information corresponding to a target comment style among the at least one reusable comment style in response to a determination that the second list comprises the address information;
generate a target comment obj ect based on the target comment message and the target comment style corresponding to the selected piece of address information, wherein the target comment style comprises data indicative of effects of presenting the target comment message on a display device; and
wherein the at least one memory further stores instructions that upon execution by the at least one processor cause the system to:
in response to a determination that the second list does not comprise any address information, generate a second comment style as the target comment style.

10. The system of claim 9, the at least one memory further storing instructions that upon execution by the at least one processor cause the system to:
obtain motion attributes associated with a plurality of comment objects, wherein the motion attributes comprise at least one of scrolling, reversing, or being static, and each of the plurality of comment objects comprises a comment message and a comment style;
obtain a first comment object among the plurality of comment objects and a first comment style of the first comment object based on the motion attributes associated with the plurality of the comment objects;
determine a state of the first comment object, wherein the state comprises an initialization state, a living state, or an end state;
obtain a first piece of address information corresponding to the first comment style; and
in response to a determination that the first comment object is in the end state, store the first piece of address information at a beginning node position of the second list.

11. The system of claim 10, the at least one memory further storing instructions that upon execution by the at least one processor cause the system to:
obtain the motion attributes from a plurality of comment styles of the plurality of comment objects;
identify motion states of the plurality of comment objects based on the motion attributes associated with the plurality of comment objects; and
select a comment object among the plurality of comment objects as the first comment object, wherein the comment object is in a motion state.

12. The system of claim 10, the at least one memory further storing instructions that upon execution by the at least one processor cause the system to:
detect data associated with each frame of the first comment object, wherein the data comprise a state attribute of each frame of the first comment object; and
determine the state of the first comment object based on the state attribute.

13. The system of claim 10, wherein the first comment style comprises information indicative of a start time and a duration of displaying the first comment object, and wherein the at least one memory further stores instructions that upon execution by the at least one processor cause the system to:
determine a time interval associated with the first comment object, wherein the start time is a left endpoint of the time interval, and a sum of the start time and the duration is a right endpoint of the time interval;
obtain a current time and determining whether the current time is within the time interval associated with the first comment object;
determine that the first comment object is in the initialization state when the current time is less than or equal to the start time;
determine that the first comment object is in the living state when the current time is within the time interval; and
determine that the first comment object is in the end state when the current time is greater than or equal to the right endpoint of the time interval.

14. The system of claim 9, the at least one memory further storing instructions that upon execution by the at least one processor cause the system to:
in response to a determination that the second list comprises only one piece of address information, select the only one piece of address information; and
in response to a determination that the second list comprises a plurality of pieces of address information, search the second list and select a piece of address information located at a beginning node of the second list.

15. The system of claim 9, the at least one memory further storing instructions that upon execution by the at least one processor cause the system to:
updating the target comment style, wherein the target comment style further comprises coordinates of presenting the target comment message on the display device; and
generating the target comment object based on the updated target comment style and the target comment message.

16. A non-transitory computer-readable storage medium, which stores computer programs that upon execution by a processor cause the processor to implement operations, the operations comprising:
obtaining a first list and a second list, wherein the first list comprises a plurality of comment messages, and the second list is configured to store address information corresponding to at least one reusable comment style;
determining whether the second list comprises the address information corresponding to the at least one reusable comment style in response to a determination that a target comment message among the plurality of comment messages is initialized;
selecting a piece of address information corresponding to a target comment style among the at least one reusable comment style in response to a determination that the second list comprises the address information;

generating a target comment object based on the target comment message and the target comment style corresponding to the selected piece of address information, wherein the target comment style comprises data indicative of effects of presenting the target comment message on a display device; and wherein the operations further comprise in response to a determination that the second list does not comprise any address information, generating a second comment style as the target comment style.

17. The non-transitory computer-readable storage medium of claim 16, the operations further comprising:

obtaining motion attributes associated with a plurality of comment objects, wherein the motion attributes comprise at least one of scrolling, reversing, or being static, and each of the plurality of comment objects comprises a comment message and a comment style;

obtaining a first comment object among the plurality of comment objects and a first comment style of the first comment object based on the motion attributes associated with the plurality of the comment objects;

determining a state of the first comment object, wherein the state comprises an initialization state, a living state, or an end state;

obtaining a first piece of address information corresponding to the first comment style; and in response to a determination that the first comment object is in the end state, storing the first piece of address information at a beginning node position of the second list.

18. The non-transitory computer-readable storage medium of claim 17, wherein the first comment style comprises information indicative of a start time and a duration of displaying the first comment object, and wherein the operations further comprise:

determining a time interval associated with the first comment object, wherein the start time is a left endpoint of the time interval, and a sum of the start time and the duration is a right endpoint of the time interval;

obtaining a current time and determining whether the current time is within the time interval associated with the first comment object;

determining that the first comment object is in the initialization state when the current time is less than or equal to the start time;

determining that the first comment object is in the living state when the current time is within the time interval; and determining that the first comment object is in the end state when the current time is greater than or equal to the right endpoint of the time interval.

* * * * *